United States Patent

Granqvist

[15] 3,684,375
[45] Aug. 15, 1972

[54] DIGITAL DISTANCE MEASURING INSTRUMENT

[72] Inventor: Carl-Erik Granqvist, Lidingo, Sweden

[73] Assignee: A G A Aktiebolag, Lidingo, Sweden

[22] Filed: Sept. 28, 1970

[21] Appl. No.: 76,206

Related U.S. Application Data

[63] Continuation of Ser. No. 783,910, Dec. 16, 1968, abandoned.

[52] U.S. Cl. .................................................356/5
[51] Int. Cl. ............................................G01c 3/08
[58] Field of Search ........................356/5; 343/5 DP

[56] References Cited

UNITED STATES PATENTS

3,446,971  12/1971  Ruddock ........................356/5

FOREIGN PATENTS OR APPLICATIONS

953,048  3/1964  Great Britain

Primary Examiner—Benjamin A. Borchelt
Assistant Examiner—S. C. Buczinski
Attorney—Larson, Taylor and Hinds

[57] ABSTRACT

A distance measuring instrument comprising a high-frequency reference source for emitting a modulated light signal and from which a first and second oscillation of 1 kHz is derived in a first and a second periodic counter, respectively. A phase control means locks the phase of the emitted signal to the first oscillation. A heterodyne frequency representing the transmitter phase is applied to transpose the received signal down to 1 kHz and a second phase detector compares the phase of this signal with the second oscillation and causes additional pulses to be supplied to the first or the second counter depending on the polarity of the phase difference so as to reduce it to zero. A forward-backward counter responds in one direction to additional pulses supplied to one periodic counter and to the opposite direction to those supplied to the other periodic counter to provide a digital indication of the phase difference corresponding to the distance.

2 Claims, 3 Drawing Figures

INVENTOR
CARL-ERIK GRANQVIST

BY Larson and Taylor
ATTORNEYS

INVENTOR
CARL-ERIK GRANQVIST

DIGITAL DISTANCE MEASURING INSTRUMENT

CROSS-REFERENCES TO RELATED APPLICATIONS

This application is a continuation of U.S. application Ser. No. 783,910, filed Dec. 16, 1968, now abandoned.

BACKGROUND OF THE INVENTION

1. Field of the Invention

The present invention relates to a distance measuring arrangement wherein a modulated light signal is transmitted over the distance to be measured and the phase delay of the received modulated signal is representative of this distance and, more particularly, to an improved arrangement of this type which provides a digital indication of the distance measured.

2. The Prior Art

One difficulty in providing a digital indication of a measured distance is that of providing control of the oscillation signals. Perhaps the most common method of adjusting the phase of an oscillation is through the use of various types of adjustable reactance networks. In accordance with another well known method phase or time relationships are measured with the aid of reference pulses which are applied to a counter during the time interval to be measured. In order to adjust the phase of an oscillation where the latter arrangement is used, it is necessary to adjust a phase-delay network such as to cause the reference pulses to be connected to the counter at a reference time corresponding to a 0° phase and to be disconnected in response to the signal whose phase is to be measured. If the signal is noisy, the time at which disconnection takes place may be influenced by the noise.

A further known phase measuring system (disclosed in British Pat. No. 998,337) includes a frequency divider chain for converting an input signal to the chain into an output signal having a fundamental frequency lower than that of the input signal. The output signal is applied to a synchronous detector and an integrator integrates the output of the detector. A pulse generator adds pulses to or inhibits pulses normally occurring at, some point on the divider chain according to whether the output from the integrator is respectively greater than or less than (or vice versa) a threshold level. An accumulator is used for storing the difference between the number of pulses added and the number of pulses inhibited.

SUMMARY OF THE INVENTION

In accordance with the present invention a distance measuring instrument provided which comprises, in combination, a source of high frequency pulses of a predetermined frequency, a periodic counter responsive to said source for producing an oscillation of a sub-multiple of said predetermined frequency, a second periodic counter responsive to said source for producing a second oscillation of said sub-multiple frequency, a transmitter for emitting a signal of a phase representative of said reference pulses, a receiver for receiving said signal after said signal has traversed the distance to be measured, the phase of the received signal representing the distance to be measured, and for driving from said received signal a secondary signal of the frequency of said second oscillation and representing said phase, a first phase control means for controlling the phase of said emitted signal relative to the phase of said first oscillator, means for modifying the number of pulses supplied to the second counter relative to the number of pulses supplied to the first counter, a second phase control means responsive to the phase difference between said secondary signal and said second oscillation for controlling said modifying means to establish phase equality between said second oscillation and said secondary signal, and a forward-backward counter responsive to said modifying means for indicating the phase difference between said first oscillation and said secondary oscillation.

Other features and advantages of the invention will be set forth in or apparent from the description of the preferred embodiments found hereinbelow.

DESCRIPTION OF THE PREFERRED EMBODIMENTS

Figure 1:
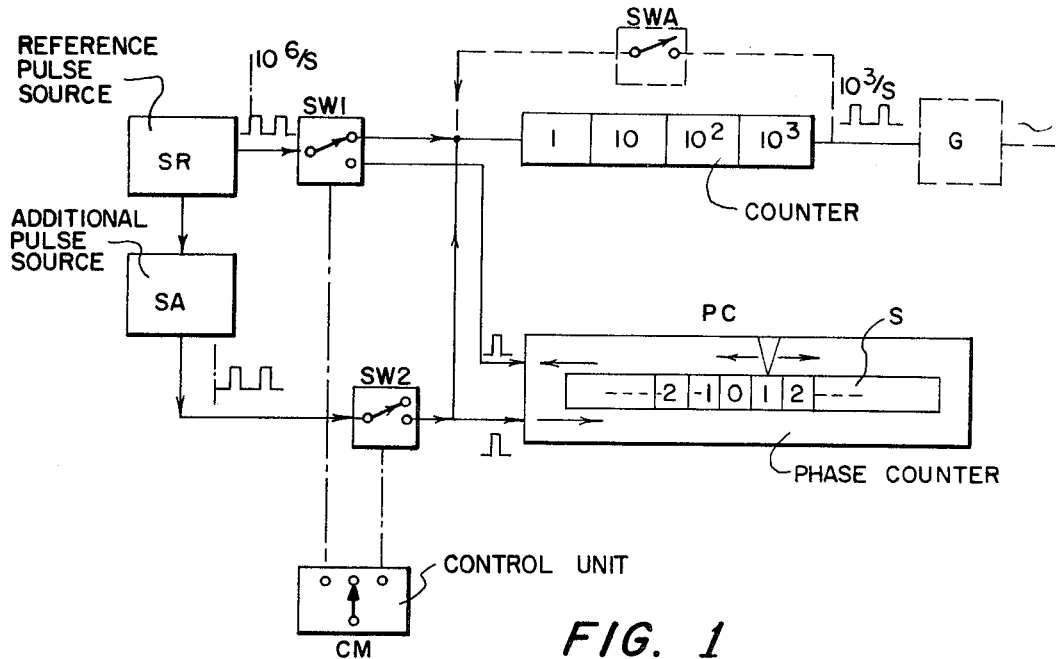
FIG. 1 is a schematic circuit diagram of an arrangement for controlling and displaying digitally the phase of an oscillation generally in accordance with the prior art.

Referring to FIG. 1, a source of reference pulses SR produces a series of pulses at a predetermined rate, for example, $10^6$ pulses per second. The pulses are applied to a switch SW1 having two outputs, one of which is coupled to the input of a periodic counter C. The capacity of the counter C is a predetermined value, for example, 1,000, so that the counter C delivers an output pulse for every 1,000th input pulse applied thereto. For the particular values given, the output pulse rate of counter C will thus be $10^3$ pulses per second. If it is desired to provide sinusoidal signals the counter output may be applied to a continuous-wave generator G indicated in dashed lines. Further, a feedback path, the purpose of which is described below, may be provided via a switch SWA also indicated in dashed lines.

The other output of SW1 is connected to the backward-stepping input of a phase counter PC, which may be a forward-backward counter of conventional construction. Phase counter PC includes backward and forward counting inputs and a scale S which provides a net indication of the pulses applied to these inputs. A source of additional pulses SA provides a series of further pulses, also at the rate of $10^6$ pulses per second. Source SA may, for example, simply be a delay circuit connected to the output of source SR which produces delayed versions of the pulses produced by source SR, although it will be understood that other types of pulse generators can be used. These additional pulses are applied to a second switch SW2, which is normally open but which in the closed state thereof applies the pulses to the forward-stepping input of phase counter PC as well as to counter C. A control unit CM provides selective actuation of either switch SW1 or switch SW2. It is noted that the frequency of the pulses produced by source SA does not have to be the same as that of the pulses produced by source SR in that application of the pulses from source SA is a function of the state of switch SW2 as determined by control unit CM.

Considering the operation of the embodiment of FIG. 1, for the normal states of switches SW1 and SW2 shown, the reference pulses from source SR are applied to counter C, which, as described hereinabove for specific example given, delivers an output pulse for every 1000th input pulse applied thereto. To advance the phase of the output oscillation from counter C, switch SW2 is actuated, which causes one or more pulses from source SA to be applied to counter C in addition to the reference pulses applied from source SR. These additional pulses are also applied to phase counter PC in the forward direction so that each pulse advances the phase counter PC by one step. Because of the additional pulses applied to counter C, the output pulse provided thereby is advanced in phase by an amount corresponding to the number of additional pulses supplied by source SA, provided, of course, that these latter pulses are separated in time from the reference pulses so that the counter C will respond to them separately. For the example given, i.e., where source SA produces pulses at a $10^6$ pulse per second rate, if each one of 500 reference pulses produced by source SR is followed by an additional pulse produced by source SA, the counter C will reach the 1,000 count at which an output pulse produced after in only half its normal period, thus corresponding to an output phase shift of 180°.

As pointed out hereinabove the additional pulses must be separate in time from the reference pulses in order to ensure that the counter C responds separately thereto. Separation of these two sets of pulses may be accomplished by well known prior art techniques. For example, as mentioned, source SA may merely comprise a delay circuit for producing delayed versions of the reference pulses, which delayed pulses are utilized as the "additional" pulses, as indicated in FIG. 1. Further, the output pulses of counter C fed back by closing switch SWA may be used to provide "additional" pulses.

A phase retardation is obtained where control unit CM is used to actuate switch SW1 to remove one or more reference pulses from the input circuit of counter C and to apply these pulses to the backward-stepping input of phase counter PC. The amount of phase retardation is registered by phase counter PC and indicated on scale S.

To summarize the operation described hereinabove, phase counter PC counts forwardly or backwardly as the number of pulses fed to counter C is increased or decreased relative to a normal rate and thereby provides a digital display of the phase of the output oscillation from counter C.

A similar system to that shown in FIG. 1 is disclosed in British Pat. No. 998,337 referred to above.

Figure 2:
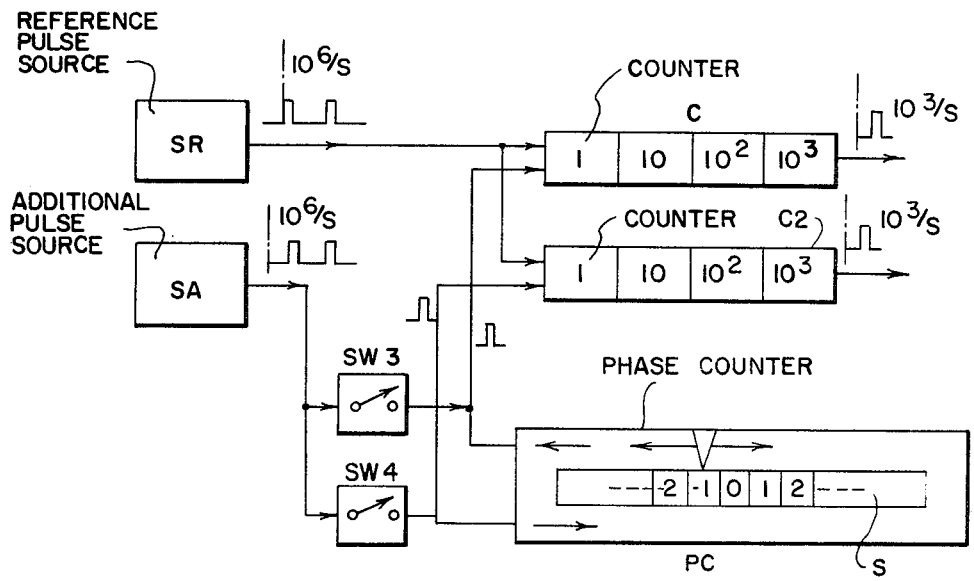
FIG. 2 is a schematic circuit diagram of an arrangement for controlling and indicating the phase of a second oscillation relative to a first oscillation, this arrangement being a modification of the circuit of FIG. 1 and being preferred for incorporation into the instrument of the invention.

Referring to FIG. 2, there is shown a schematic circuit diagram of a system wherein the phase of one oscillation is controlled relative to a second oscillation. The circuit of FIG. 2 is similar to that of FIG. 1 and like elements therein have been given the same reference letters. In FIG. 2, the output of a source SR is connected to the inputs of first and second counters C and C2, each of which operates as described in connection with FIG. 1. An auxiliary source SA is connected through a switch SW3 to an additional input of counter C and to the backward-stepping input of phase counter PC. Similarly, the additional pulses produced by source SA are applied to a second switch SW2 for application to a second input of counter C2 and to the forward stepping input of phase counter PC.

In operation, closing of SW3 causes the application of the additional pulses to counter C, which pulses are counted backwardly by phase counter PC. Closing of SW4 causes pulses to be applied to counter C2 and to the forward input of phase counter PC, to thereby provide a display of the phase of the output oscillation from counter C2 relative to that of counter C.

Figure 3:
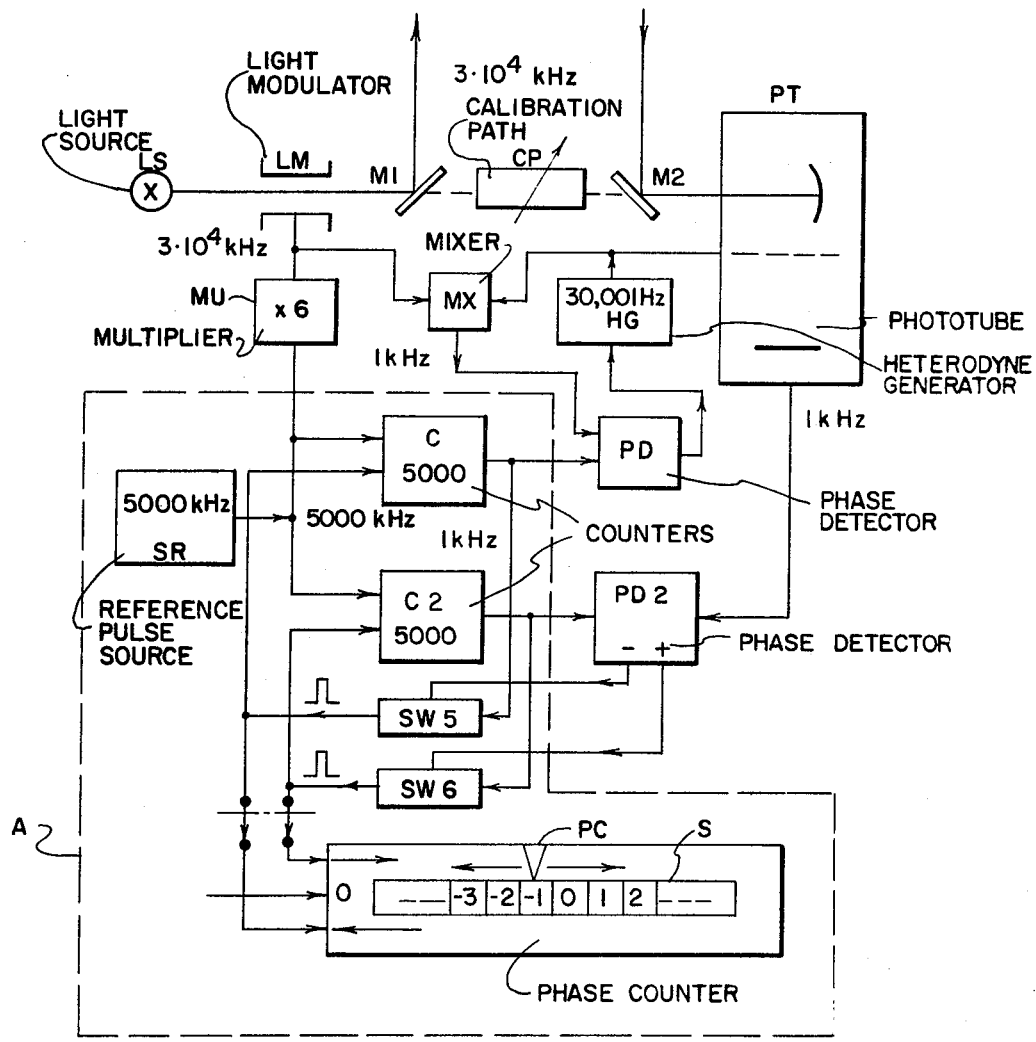
FIG. 3 is a schematic circuit diagram of an instrument for measuring distance in accordance with the invention.

Referring to FIG. 3 there is shown an embodiment of the invention incorporated in a distance measuring instrument of the type which emits a modulated light beam and compares the modulation phase of a reflected beam with that of light which has been passed to the receiver over a calibration path provided in the instrument. The embodiment of FIG. 3 includes a phase adjusting and indicating arrangement generally denoted A and enclosed within dashed lines. This arrangement is similar to that shown in FIG. 2 like elements have been denoted by the same reference letters as previously used. In the embodiment of FIG. 3, light from a light source LS is passed through a light modulator LM such as a Kerr cell and is transmitted as a modulated beam via an optical system comprising a mirror M1. The reflected or returned beam is directed by a second mirror M2 to a phototube PT. The modulation signal for the Kerr cell is provided by a frequency multiplier MU which, in a specific example, receives a 5,000 kHz signal from a source of reference signal SR and which multiplies this signal by 6. The output voltage of 30,000 kHz produced by multiplier MU is applied to light modulator LM. A control grid of phototube PT is modulated by a 30,001 kHz voltage delivered by a heterodyne generator HG so that the output voltage of phototube PT has a frequency of 1 kHz.

The outputs of heterodyne generator HG and of multiplier MU are applied to a mixer MX which yields a 1-kHz output voltage. The signal produced by mixer MX is applied to a first phase detector PD which produces a phase control voltage in response to the phase difference between the voltages applied to two inputs thereof and which controls the phase of heterodyne generator HG. A second phase detector PD2 is provided to compare the phase of the output signal of phototube PT with that of the input signal supplied to the other input of phase detector PD2.

As stated hereinabove, the arrangement denoted A in FIG. 3 is substantially the same as that shown in FIG. 2. In FIG. 3, pulses from the outputs of counters C and C2 are applied to first and second switches SW5 and SW6, respectively. Switch SW5 is connected to a second input of counter C and to the backward-stepping input of a phase counter PC, whereas the output of switch SW6 is connected to an input of counter C2 and to the forward-stepping input of phase counter PC. The switches SW5 and SW6 are controlled by outputs from PD2 such that switch SW5 is open only if the phase difference between the signals applied to PD2 is negative and switch SW6 is open only if this phase difference is positive. The second inputs of phase detectors PD and PD2 are connected to the outputs of counters C and C2, respectively.

In the operation of the system of FIG. 3, a modulated light beam from light source LS passes either over the distance to be measured, as indicated in the drawing, or, if the mirrors M1 and M2 are removed, via an adjustable calibration path CP to phototube PT. Preliminarily, calibration path CP is adjusted to make the phase of the emitted beam equal to the output phase of counter C and the phase of the received beam equal to output phase of counter C2. Phase counter PC is then set at a zero reading and the instrument is prepared for measuring the distance in question, mirrors M1 and M2 being placed as shown in FIG. 3. It will be appreciated that the received beam has a delay corresponding to the distance to be measured. At this time, the phase of the emitted beam is still equal to the phase of the output from counter C. Phase counter PC is switched into operation and the phase of counter C2 relative to counter C is adjusted by means of additional pulses through switches SW5 and SW6 in the positive or the negative direction until there is phase equality between the inputs to phase detector PD2. The received signal from phototube PT is then in phase with the output from counter C2, and the existing phase difference is displayed on phase counter PC, which can be graduated in appropriate units of length such as meters.

It will be appreciated that if two signals of equal frequency and different phases are both heterodyned with one and the same frequency, then the transposed frequencies also have the same phase difference. Such heterodyning takes place in the present instrument wherein the emitted beam is modulated with a 30,000 kHz signal and the phase measurement takes place at 1 kHz. The low frequency signal whose phase represents the emitted beam is derived from mixer MX, wherein the 30,000 kHz oscillation modulating the emitted beam is heterodyned with 30,001 kHz from heterodyne generator HG. The first phase detector PD compares the output phase from mixer MX with that from counter C and derives a phase control voltage which adjusts the phase of heterodyne generator HG and reduces the phase difference between the two inputs of phase detector PD to zero.

With the beam passing over the calibration path CP and phase counter PC reset to zero, second phase detector PD2 compares the phases at the two inputs thereof and actuates either switch SW5 or switch SW6 until the phase difference between the outputs from counters C and C2 equals that between the outputs from mixer MX and phototube PT, that is, corresponds to the delay over the calibration path.

This process is repeated in the same general way with the beam passing over the unknown distance except that phase counter PC is then activated so that every adjustment of the phase difference is registered by a corresponding count on phase counter PC. When there is no phase difference between the inputs to second phase detector PD2, no signal exists at either the "negative" or the "positive" output thereof and the phase difference between the outputs from counters C and C2 corresponds to the difference in time delay over the unknown distance and over the calibration path CP.

Although the invention has been described in detail with particular reference to preferred embodiments thereof, it will be understood that variations and modifications can be effected within the scope and spirit of the invention as described hereinabove and as defined in the appended claims.

I claim:

1. A distance measuring instrument comprising, in combination: a source of high-frequency reference pulses of a predetermined frequency, a first periodic counter responsive to said source for producing a first oscillation of a submultiple of said predetermined frequency, a second periodic counter responsive to said source for producing a second oscillation of said submultiple frequency, a transmitter for emitting a signal of a phase representative of said reference pulses, a receiver for receiving said signal after said signal has traversed the distance to be measured, the phase of said received signal representing the distance to be measured, and for deriving from said received signal a secondary signal of the frequency of said second oscillation and representing said phase, a first phase control means for controlling the phase of said emitted signal relative to the phase of said first oscillation, means for modifying the number of pulses supplied to said second counter relative to the number supplied to said first counter, a second phase control means responsive to the phase difference between said secondary signal and said second oscillation for controlling said modifying means to establish phase equality between said second oscillation and said secondary signal, and a forward-backward counter responsive to said modifying means for indicating the phase difference between said first oscillation and said secondary oscillation.

2. An instrument as claimed in claim 1, in which said modifying means comprises a first switch for supplying additional pulses to said first counter, and to said forward-backward counter for actuating said forward-backward counter in the forward direction and a second switch for supplying additional pulses to said second counter, and to said forward-backward counter for actuating forward-backward counter in the backward direction.

* * * * *